(31.)
WILLIAM A. CLARK.
Improvement in Boxes for Carriage Wheels.
No. 121,706.              Patented Dec. 12, 1871.
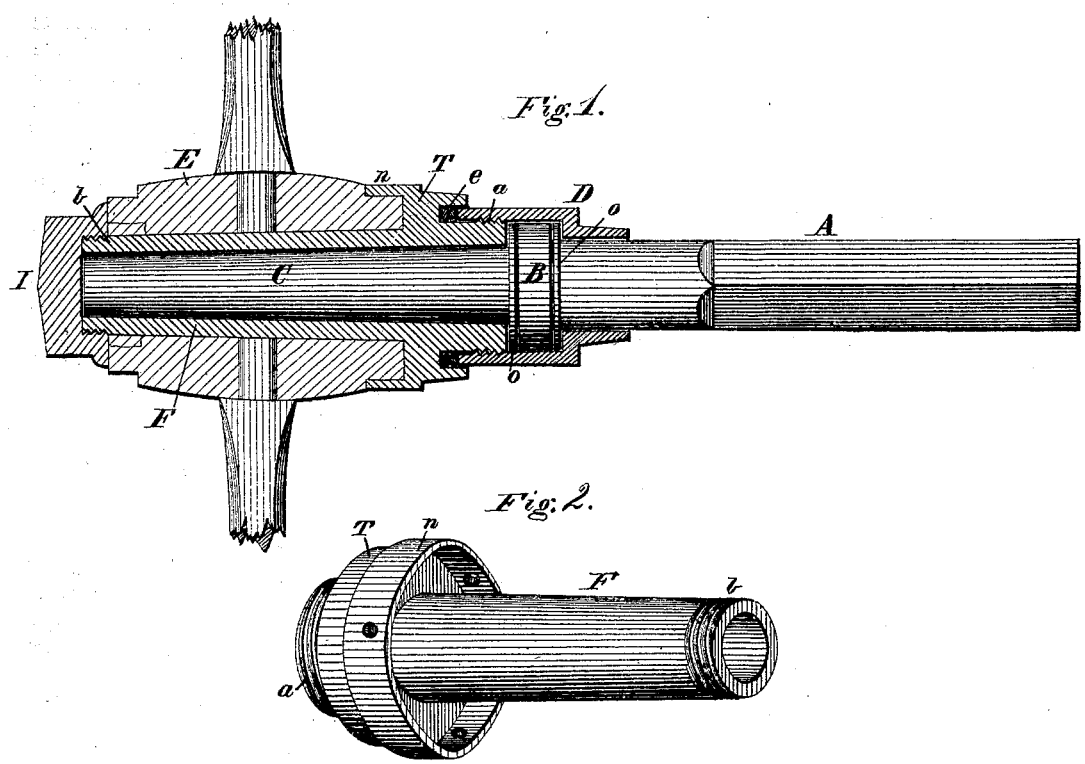
Witnesses.           Inventor.
Harry King
Phil. T. Dodge
Wm. A. Clark,
by Dodge & Munn
Attys.

121,706

UNITED STATES PATENT OFFICE.

WILLIAM A. CLARK, OF WESTVILLE, CONNECTICUT.

IMPROVEMENT IN BOXES FOR CARRIAGE-WHEELS.

Specification forming part of Letters Patent No. 121,706, dated December 12, 1871.

*To all whom it may concern:*

Be it known that I, WILLIAM A. CLARK, of Westville, in the county of New Haven and State of Connecticut, have invented certain Improvements in Boxes for Carriage-Wheels, of which the following is a specification, reference being had to the accompanying drawing.

My invention relates to pipe-boxes for the hubs of carriage-wheels; and the invention consists in a novel manner of constructing the same and applying it to the hub, and in the manner of securing the wheel upon the axle, as hereinafter more fully explained.

Figure 1 is a longitudinal section of a hub with my improvements, the hub being shown secured upon the axle. Fig. 2 is a perspective view of the improved box, shown detached.

It has long been common to make pipe-boxes to extend through the hub from end to end, but they have heretofore been made with only a shoulder, if anything, at their larger end, the ends of the hub being secured by separate bands shrunk or driven on.

My present invention has for its object to so construct and apply the box to the hub as to dispense with the ring or band usually applied to its inner end.

As represented in the drawing, I make the box F in the form of a pipe to extend through the hub, as usual, and on its inner end I make a radially-projecting shoulder, T, on which I also make an annular flange or band, $n$, as clearly shown in Figs. 1 and 2, the radial shoulder T and flange $n$ thus forming an annular recess, into which the inner end of the hub E fits snugly when the box is properly applied to the hub, as represented in Fig. 1. By this method of constructing and applying the box to the hub the flange $n$ serves the purpose and takes the place of the separate band heretofore used. The box F is made long enough to protrude a short distance through the hub at its outer end, where it has a screw-thread, $b$, cut or cast on it, and by means of which a cap, I, is screwed thereon, fitting tightly up against the outer end of the hub, thus holding the box F securely in the hub, and also closes completely the outer end of the box, as represented in Fig. 1.

This improved box is especially applicable to those wheels which have a small hub; and as represented in Fig. 1, I intend it for use in those wheels which are fastened to the axle at the inner end of the hub. In such cases the axle A is provided with a flange or collar, B, with a loose cap, D, fitted on the axle, bearing against the inner shoulder of the collar, and extending over it and the inner end of the box, to which it is screwed fast, as represented in Fig. 1, this method of fastening the wheels to the axle having been heretofore patented to me.

In the former patent, however, the cap D simply screwed onto the projecting end of the box F, whereas in the present case I form in the inner or adjoining face of the shoulder T an annular groove, $e$, and make the cap D long enough to have its outer end fit therein, as shown in Fig. 1. In this groove I place a packing of any suitable material, which serves to keep the joint tight and excludes all dust, mud, and grit from the box and spindle of the axle. On each side of the collar B of the axle is placed a leather or other washer, $o$, as shown in Fig. 1, and as these become worn by use the packing in the groove $e$ can be reduced in quantity or removed entirely, as may be found necessary, and thus permit the end of the cap D to be inserted as much further as may be necessary to compensate for the wear of the said washers.

It is obvious that the box may be made and used with a flange, $n$, when the wheel is fastened upon the axle in the ordinary manner, as well as when secured at its inner side by the cap D; but in such case the cap I should be made with a hole through its center for the end of the spindle or arm C to protrude through, so as to have the usual nut applied at that end to hold the wheel on.

Having thus described my invention, what I claim is—

1. The pipe-box F, having the band or flange $n$ formed thereon to fit over the end of the hub, substantially as described.

2. The box F provided with the groove $e$, in combination with the screw-cap D held in place on the axle by the collar B, all constructed and arranged to operate substantially as herein described.

WM. A. CLARK.

Witnesses:
J. McKENNEY,
W. C. DODGE.

(31)